United States Patent [19]
Gates

[11] 3,827,310
[45] Aug. 6, 1974

[54] TRANSMISSION FOR WHEELED VEHICLE

[75] Inventor: Donald C. Gates, Troy, Mich.

[73] Assignee: EVI, Sterling Heights, Mich.

[22] Filed: Dec. 29, 1972

[21] Appl. No.: 319,640

[52] U.S. Cl. .............................................. 74/217 S
[51] Int. Cl. ............................................. F16h 9/04
[58] Field of Search ....................... 74/217 R, 217 S

[56] References Cited
UNITED STATES PATENTS

| | | | |
|---|---|---|---|
| 3,604,279 | 9/1971 | Davis | 74/217 S X |
| 3,610,062 | 10/1971 | Hoff | 74/217 S X |
| 3,653,273 | 4/1972 | Albertson et al. | 74/217 S X |

*Primary Examiner*—Leonard H. Gerin
*Attorney, Agent, or Firm*—Whittemore, Hulbert & Belknap

[57] ABSTRACT

A transmission for a pedal-driven vehicle. The transmission sprockets are rotatably mounted on a tubular shaft and are individually engaged by ratchet assemblies on the shaft. The ratchet assemblies are operated by a transmission shift rod axially slidably mounted in the shaft. The pedal drive is a dual system having pedals for each of two passengers to drive the tubular shaft. Over-running clutches associated with each set of pedals permits one passenger to hold his pedals stationary while the other passenger pedals.

9 Claims, 10 Drawing Figures

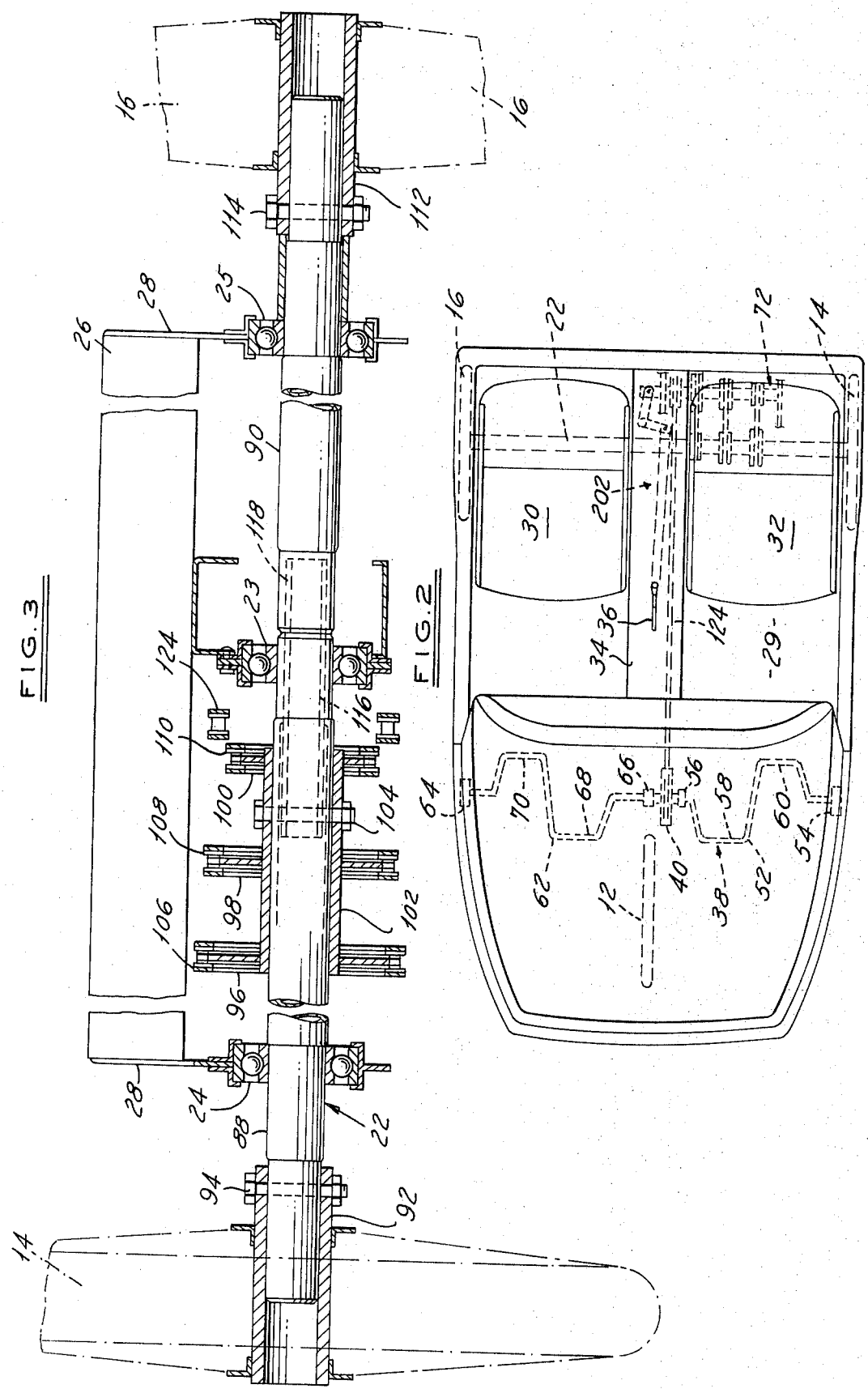

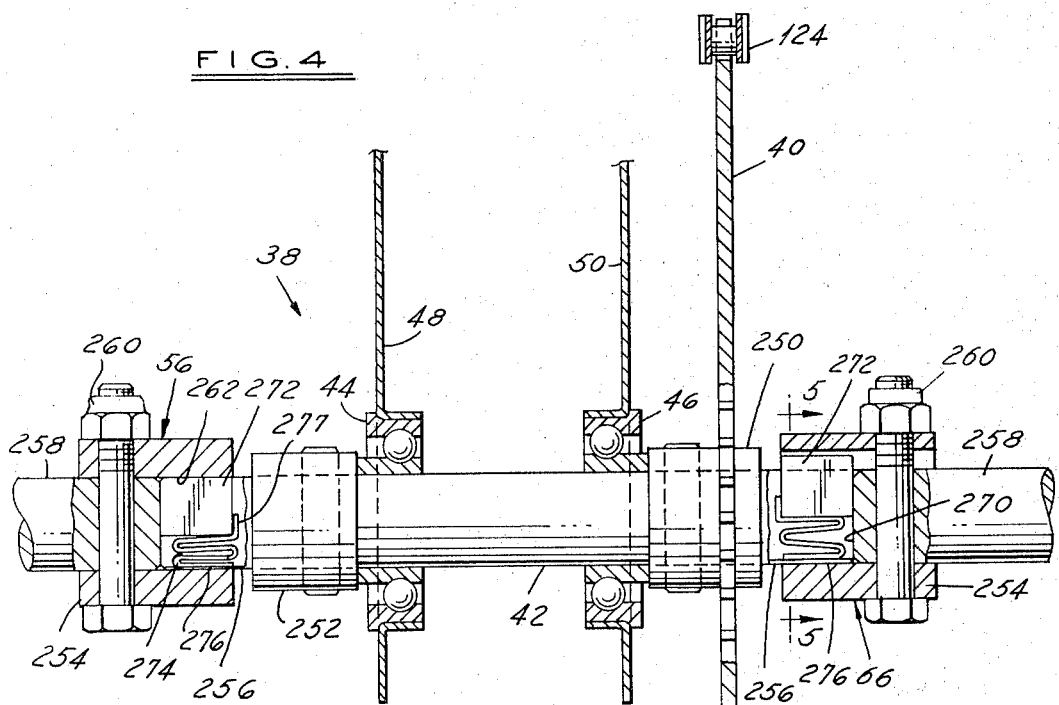
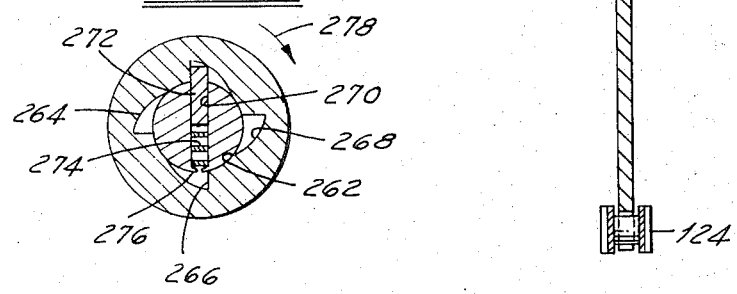

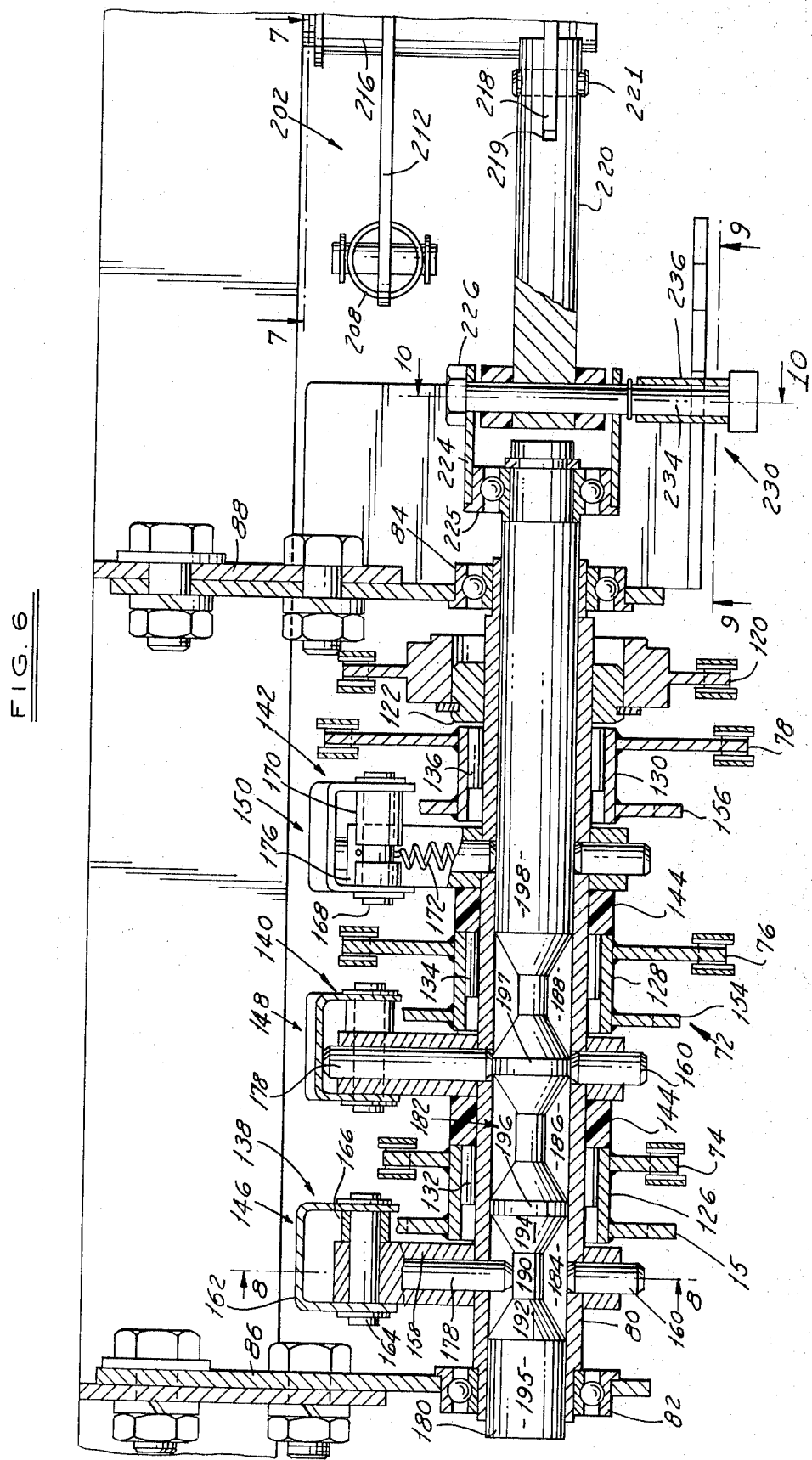

3,827,310

TRANSMISSION FOR WHEELED VEHICLE

SUMMARY OF THE INVENTION

A novel transmission is provided which is particularly useful in a pedal-drive for a wheeled vehicle. In the preferred embodiment disclosed herein, a plurality of transmission gears or sprockets are rotatably mounted upon a tubular power input shaft, and a ratchet assembly is associated with each transmission gear to engage therewith and transmit power to a wheel or wheels of the vehicle. As will appear more fully hereinafter, a shift rod axially slidably mounted in the tubular shaft is provided to engage any one of the ratchet assemblies with its associated transmission gear while at the same time disengaging the other ratchet assemblies.

The transmission is such that it may be shifted from one gear to another at any time, whether the vehicle is standing still, under power or coasting. Shifting is accomplished easily and smoothly whether shifting up or down. There is no neutral or mementary disconnect between the pedals and the drive wheel or wheels.

The system also incorporates a novel dual pedal drive whereby either one or both of two riders may pedal the vehicle. The system provides independent coast and pedal capability so that one rider may hold his pedals stationary while the other rider pedals.

In the Drawings:

FIG. 2 is a top plan view of the vehicle shown in FIG. 1.

FIG. 3 is an enlarged view with parts in section of the rear axle as it appears from the rear of the vehicle.

FIG. 4 is an enlarged fragmentary view with parts in section showing the front sprocket and overrunning clutches by which the sprocket is connected to the pedals.

FIG. 5 is a cross-sectional view taken on the line 5—5 in FIG. 4.

FIG. 6 is a view partly in elevation and partly in section of the transmission as it appears from the rear of the vehicle.

Referring now more particularly to the drawings, the pedal drive and transmission of my invention are here shown applied to a three-wheel two-passenger vehicle although it should be understood that they are not necessarily limited to that particular use.

Figure 1:
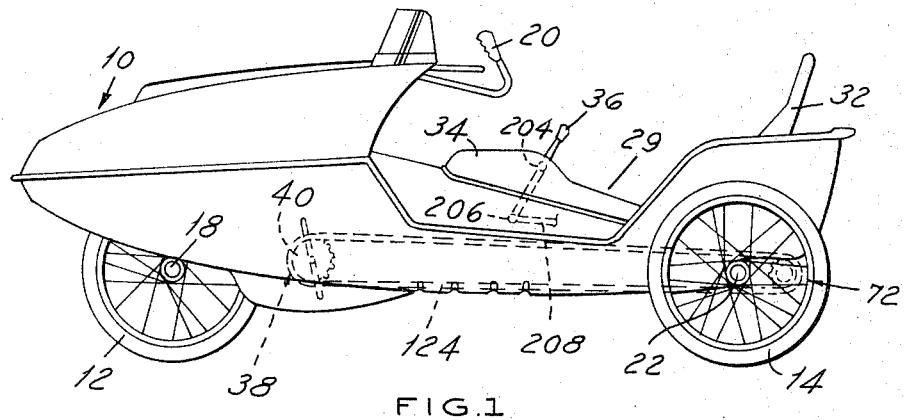
FIG. 1 is a side elevational view of a pedal-driven wheeled vehicle embodying my invention.
Figure 7:
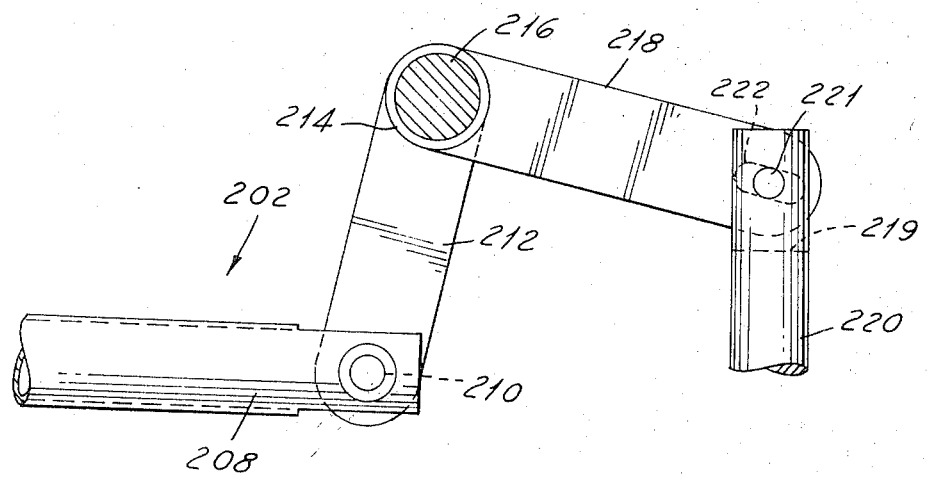
FIG. 7 is a fragmentary view with parts in section and parts in elevation taken on the line 7—7 in FIG. 6.

The vehicle as best seen in FIGS. 1 and 2 comprises a vehicle body 10 which may be molded of plastic or made of metal or any suitable material and shaped in this instance to simulate an open car or carriage. The vehicle body is supported on the ground by three wheels 12, 14 and 16. The front wheel is mounted on a steering axle 18 which is pivotally mounted under the front portion of the vehicle body for movement about a vertical axis under the control of the steering handles 20 by any suitable connection forming no part of the present invention. The rear wheels 14 and 16 are mounted on a transverse axle 22 at the rear of the body 10 which is supported for rotation in bearings 23, 24 and 25 connected to the vehicle body frame part 26 by brackets 28.

The vehicle is shown as having an open passenger compartment 29 in which are located the two seats 30 and 32 placed side by side and separated by a raised tunnel 34 which extends substantially on the longitudinal center line of the vehicle body and up through which projects the manual shift lever 36 by means of which the gears may be shifted by either passenger.

The vehicle is powered by a dual pedal drive 38 in the forward part of the passenger compartment 29. The dual pedal unit comprises a sprocket 40 mounted on a driven shaft 42 which extends transversely of the vehicle and is supported for rotation in bearings 44 and 46 carried by the vehicle body frame parts 48 and 50. The left pedal unit 52 is in the form of a bent rod whose outer end is journaled for rotation on the vehicle body by a bearing 54 and whose inner end is connected by an overrunning clutch 56 to one end of the driven shaft 42 upon which the forward sprocket 40 is mounted. The pedal unit 52 is of generally S shape to provide the foot pedal portions 58 and 60 which may be pedaled by the passenger in seat 32 to rotate sprocket 40. The right pedal unit 62 is substantially a mirror image of the left pedal unit, being likewise in the form of a bent rod having the outer end journaled in a bearing 64 carried by the body 10 and the inner end connected by an overrunning clutch 66 to the other end of the driven shaft 42 upon which the sprocket 40 is mounted. The right pedal unit 62, like the left unit, is generally S-shaped to provide the pedal portions 68 and 70 so that a person occupying seat 30 may by normal foot pedaling action rotate the forward sprocket 40. The overrunning clutches 56 and 66 are such that one person may keep his feet stationary on his pedals while the other passenger does the pedaling, as will appear more fully hereinafter.

To the rear of the rear axle 22, there is a transmission 72 having laterally spaced, small, intermediate and large transmission sprockets 74, 76 and 78 rotatably mounted thereon for transmitting power to the left rear wheel 14 on the axle 22. As will appear more clearly hereinafter, the right rear wheel is preferably not a driven wheel and is therefore not connected to the transmission. The transmission 72 includes a transverse tubular shaft 80 upon which the transmission gears are mounted for rotation. Such shaft 80 is supported for rotation in bearings 82 and 84 mounted upon the vehicle body 10 by brackets 86 and 87.

Referring again to FIG. 3, the rear axle 22 comprises the left or driven axle shaft 88 and the right or non-driven freely rotatable axle shaft 90. The left axle shaft is journaled in the bearings 23 and 24 and has the hub 92 of the left rear wheel 14 rigidly secured thereto by the fastener assembly 94. Large, intermediate and small sprockets 96, 98 and 100 are rigidly secured in laterally spaced relation upon a hub 102 which is sleeved upon the axle shaft 88 and securely fastened thereto by the nut and bolt assembly 104. The sprockets 96, 98 and 100 are located directly ahead of the transmission sprockets 74, 76 and 78. Drive chain 106 extends around sprockets 74 and 96, drive chain 108 extends around sprockets 76 and 98, and drive chain 110 extends around sprockets 78 and 100. These sprockets may of course be in the form of gears, if desired. Power from the transmission is delivered to the axle shaft 88 of the left rear wheel by one of these chains, depending upon which of the transmission sprockets 74, 76 and 78 is engaged.

The right or free turning axle shaft 90 has the hub 112 of the right rear wheel 16 fastened thereto by the nut and bolt assembly 114 and is journaled intermediate its length by the bearing 25. The inner end of the axle shaft 90 substantially abuts the inner end of the axle shaft 88. At least the inner end portion of the axle shaft 88 is tubular to receive the bearing shaft 116 telescoped therein and secured thereto by the nut and bolt assembly 104. The bearing shaft 116 extends beyond the inner end of the axle shaft 88 and into the socketed inner end of the axle shaft 90 to provide a bearing support 118 for such socketed inner end.

Referring again to FIG. 6 for a further description of the transmission, a power input sprocket 120 is rigidly secured upon a hub 122 which is welded or otherwise permanently secured to the transmission shaft 80. A drive chain 124 passes over the forward sprocket 40 and also over the power input sprocket 120 of the transmission whereby the motive force for driving the vehicle is transmitted from the dual pedal drive 38 to the transmission 72.

As before stated, the transmission sprockets 74, 76 and 78 are rotatably mounted upon the transmission shaft 80. More particularly, the transmission sprockets 74, 76 and 78 are rigidly secured to hubs 126, 128 and 130 which in turn are mounted for free rotation upon the axle shaft by bearings 132, 134 and 136. Ratchet assemblies 138, 140 and 142 are associated respectively with the transmission sprockets 74, 76 and 78, each ratchet assembly being disposed to one side of its associated transmission sprocket. Suitable spacers 144 may if desired be provided between certain of the ratchet assemblies and transmission sprocket hubs, as shown.

The ratchet assemblies 138, 140 and 142 are of substantially identical construction. Each includes a ratchet pawl unit 146, 148 and 150 and a ratchet gear 152, 154 and 156 which latter are respectively rigidly secured upon the hubs 126, 128 and 130 for the transmission sprockets.

The ratchet gears 152, 154 and 156 are of the same size and shape. The ratchet pawl unit each comprises a block or housing 158 rigidly secured upon the transmission shaft by a pin 160. A channel-shaped pawl 162 is pivoted near one end to the housing 158 by a pivot pin 164. A spacer 166 preferably is provided on the pivot pin to fill the space between the housing and one flange of the pawl. A pin 168 near the opposite end of the pawl extends between the flanges thereof and has sleeved thereon a collar providing a detent 170 aligned and adapted to engage with the teeth of the associated ratchet gear. A tension coil spring 172 connected at one end to the pin 168 and at the other end to a pin 174 carried by the housing 158 places a constant bias on the pawl 162 tending to engage the pawl detent with the ratchet gear teeth. If desired, a collar 176 may be provided on the pin 168 to confine the end of the spring 172.

Figure 8:
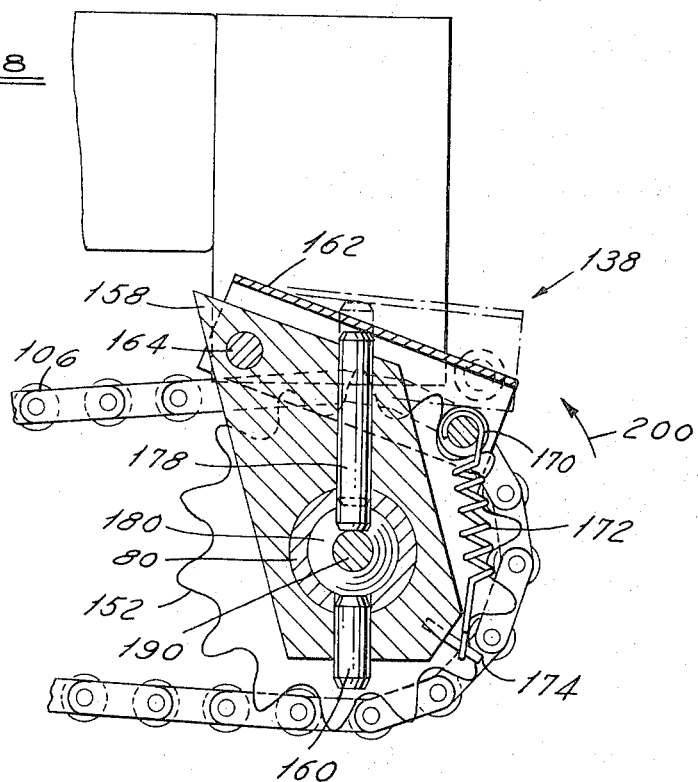
FIG. 8 is a sectional view taken on the line 8—8 in FIG. 6.

The pivotally supported pawl 162 is capable of movement from an operative position in which its detent 170 is engaged with the teeth of the ratchet gear as shown in solid lines in FIG. 8, to an inoperative position in which the detent is raised clear of the ratchet gear as shown in dotted lines. The means for lowering and raising the pawl into and out of ratchet gear engagement includes the pin 178 which is slidably mounted in a bore in the housing 158. The outer end of the pin is engageable with the base of the channel-shaped pawl 162 at a point intermediate its ends. The inner end of the pin extends through a registering opening in the transmission shaft 80 for engagement with a shift rod 180. The shift rod is axially slidable within the transmission shaft 80 to shift the transmission so as to engage any one of the transmission sprockets 74, 76 and 78. The shift rod 180 is shifted by the gear shift lever 36 through a linkage which will be more fully described hereinafter.

The shift rod 180 is of uniform circular diameter throughout a substantial part of its length, and of a size corresponding to the internal diameter of the shaft 80 to be snugly yet slidably received therein. At an intermediate point in its length, the rod has a special cam surface formation generally designated 182. Such cam surface includes the three axially spaced generally conical recesses 184, 186 and 188, one for each of the ratchet assemblies. The recesses 184, 186 and 188 in the present instance are of identical formation. Each recess has a central cylindrical surface 190 located on the longitudinal center line of the shift rod. It is connected to the full diameter portions of the rod on either side by the frustoconical portions 192 and 194. As noted, the other recesses 186 and 188 are of the same configuration. The full diameter portions of the rod separating the recesses 184, 186 and 188 and those immediately adjacent the outer ends of the recesses 184 and 188 comprise portions of the cam surfaces which are called lands and which are also portions of the cam surface of the shift rod. Such lands are designated 195, 196, 197 and 198.

When a pin 178 of a ratchet assembly engages the bottom 190 of a recess on the shift rod, the pawl 162 is permitted to move inwardly under the tension of spring 172 to cause its detent 170 to engage the teeth of its associated ratchet gear (solid lines, FIG. 8). When on the other hand the pin 178 rides up on one of the lands 195-198 of the shift rod, the pin 178 lifts the pawl 162 to its inoperative position (dotted lines, FIG. 8) to disengage its detent 170 from the associated ratchet gear.

FIG. 6 shows the shift rod 180 in one of its three positions in which the pin 178 of the ratchet assembly 138 engages the leftmost recess 184 on the shift rod causing ratchet assembly 138 to be engaged. At the same time, the pins on the other ratchet assemblies 140 and 142 ride on lands 197 and 198 to disengage such ratchet assemblies. In a second position of the shift rod 180, it is shifted to the right in FIG. 6 far enough to cause the pin 178 of ratchet assembly 138 to ride up to land 195, the pin 178 of ratchet assembly 140 to engage the bottom 190 of the recess 186, and the pin 178 of ratchet assembly 142 to remain on the land 198. In this position, only the middle ratchet assembly 140 is engaged. In a third position of the shift rod 180, it is moved a further increment to the right. The pin 178 of ratchet assembly 142 engages the low point 190 of the recess 188 to engage such ratchet assembly, while the pins of the other two ratchet assemblies 138 and 140 ride up on the lands 195 and 196.

FIG. 8 shows one of the ratchet assemblies when the pawl 162 is engaged with its associated ratchet gear (solid lines) and when it is disengaged therefrom (dotted lines). The direction of rotation of the tubular shaft 80 and hence of the ratchet assemblies when the vehicle is pedaled in a forward direction is counterclockwise as indicated by the arrow 200 in FIG. 8. As will be seen, the construction and arrangement of the ratchet pawl, including the location of its pivot 164 and its detent 170, together with the formation of the ratchet gear teeth and their relation to the pawl is such that upon counterclockwise rotation of the pawl 162 in FIG. 8 with its detent 170 engaged between the teeth of the associated ratchet gear, the ratchet gear is rotated by the pawl. The force of rotation of the pawl causes its detent to pull or press deeper into the space between the gear teeth without any possibility of the detent camming or lifting away from the ratchet gear. The pawl will not pivot away from the ratchet gear during rotation about the axis of shaft 80 even when on the underside of the shaft because of the pull of the pawl detent 170 and also the constant bias on the detent applied by the tension spring 172.

When the vehicle is moving, all of the transmission sprockets 74, 76 and 78 are rotated by the sprocket chains 106, 108 and 110 from the sprockets 96, 98 and 100 on the axle shaft 88, no matter which transmission sprocket is driving. However, because of the difference in diameter of the sprockets, transmission sprocket 74 rotates fastest, transmission sprocket 78 rotates slowest and transmission sprocket 76 rotates at an intermediate speed. Hence gear 152 is "first" or "low" gear, gear 154 is "second" gear and gear 156 is "third" or "high" gear.

As noted previously, the transmission is such that it may be shifted from one gear to another at any time, whether the vehicle is standing still, under power or coasting, and the shifting is accomplished easily and smoothly whether shifting up or down. This is in part because of the special configuration of the cam surface 182 on the shift rod 180. This cam surface profile during a shift from one gear to another allows the pawl springs 172 to pull both pawl detents 170 against their respective ratchet gears. The higher gear will always engage, allowing the lower gear to momentarily ratchet due to the differential speed. Sprockets or gears 74, 76 and 78 in the present embodiment are respectively first, second and third gears and thus during a shift from first to second gear, the pins 178 of the ratchet assemblies 138 and 140 will both engage on the tapered surfaces 192, 194 of the cam surface recesses 184 and 186. Thus ratchet assembly 138 will be gradually disengaged as ratchet assembly 140 becomes engaged and takes over the drive. Since both pawls will be biased towards gear engagement by springs 172 during the shift, when the ratchet assembly 140 takes over the drive, the gear 152 of ratchet assembly 138 will momentarily ratchet counterclockwise past its pawl by the camming action of its teeth on the pawl detent 170. When the shift is completed, the lower gear pawl, in this instance that of ratchet assembly 138, is fully lifted against its spring force to the dotted line position in FIG. 8 free of its ratchet gear.

Thus there is no neutral or momentary disconnect between the pedal shaft and the driven wheel 14 of the vehicle. During any shift from a lower gear up or from a higher gear down, the shift takes place smoothly with the higher gear being engaged while the lower gear momentarily ratchets. It is this overlap of the ratchet action during a shift which provides the smooth easy shifting whether the vehicle is standing still, under power or coasting.

The shift rod 180 is shifted to one of its three positions by the shift lever 36 through the linkage 202. The lever 36 is pivoted intermediate its ends to a pin 204 mounted on the tunnel portion 34 of the vehicle body 10 and is pivoted at its lower end 206 to one end of a shift rod 208 which is pivoted at its opposite end where indicated at 210 to one arm 212 of a bellcrank lever 214. The bellcrank lever has a vertical shaft 216 secured by any suitable means to the body 10, and also has a second arm 218 secured to the vertical shaft 216. The arm 218 extends into a slot 219 in an end of rod 220. A pin 221 extends across the slot through a slot 222 in arm 218 to provide a lost-motion connection. Rod 220 is pinned to a sleeve 224 of bearing 225 by a bolt assembly 226. The bearing 225 rotatably supports one end of the shift rod 180 so that the shift rod is capable of rotating with the shaft 80. The cam surface 182 is of course symmetrical with respect to the longitudinal center line of the shift rod so that the rod may rotate within the shaft 80 without affecting the shifting action.

Figure 9:
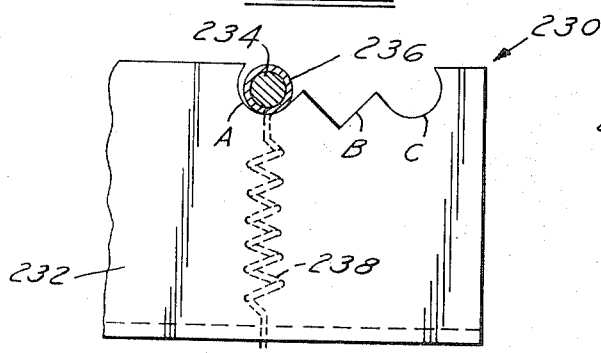
FIG. 9 is a view partly in section and partly in elevation taken on the line 9—9 in FIG. 6.
Figure 10:
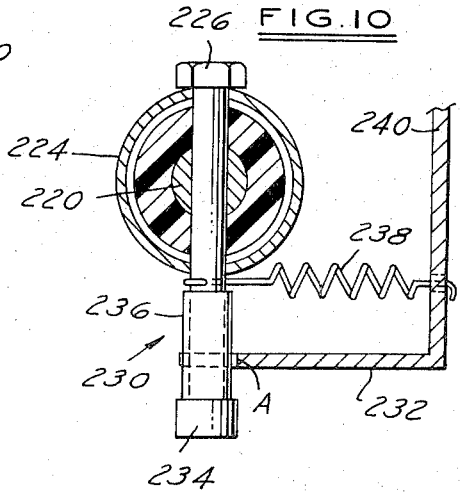
FIG. 10 is a sectional view taken on the line 10—10 in FIG. 6.

The three shift positions, first, second and third gears, of the shift rod are determined by a detent assembly 230 best shown in FIGS. 6, 9 and 10. The detent assembly includes a detent plate 232 having the recesses A, B and C in its top surface. The bolt assembly 226 by which the rod 220 is connected to the bearing sleeve 224 has an integral extension or arm 234 provided with a sleeve 236 which may be received in any one of the recesses A, B or C. A tension coil spring 238 extending between the arm 234 and the base plate portion 240 of the detent plate 232 places a constant bias on the arm 234 tending to pull it down into one of the recesses A, B or C. There is enough play or looseness in the pin and slot connection 219-221 to permit this small amount of rocking movement of the arm 234 as the shift rod 180 is shifted from one to another of its positions A,B,C.

The shift rod 180 is shown in first gear to engage ratchet assembly 138, with detent arm 234 in recess A to accurately locate the shift rod. It will be understood that when the shift rod 180 is shifted to engage the ratchet assembly 140, that is when its pin 178 engages the bottom 190 of cam surface recess 186, the detent arm 234 will rest in recess B, and that when the shift rod is shifted to engage the ratchet assembly 142 so that its pin 178 engages the bottom 190 of recess 188, the detent arm 234 will be in recess C.

The adjacent sides of the recesses A, B and C are upwardly tapered as shown in FIG. 9 so that the arm 234 can readily cam from one recess to another.

Referring again to FIGS. 2, 4 and 5, the pedal drive will now be described in greater detail. The forward sprocket 40 has a hub 250 which is pinned to the drive shaft 42 as shown for rotation therewith. The hub 250 also serves as a spacer between the clutch 66 and the bearing 46. A similar hub 252 is pinned to shaft 42 and serves as a spacer between bearing 44 and clutch 56.

The overrunning clutches 56 and 66 are mirror images of one another. Each comprises an outer tubular member 254 and an inner member 256 received in the outer member. The outer member 254 is in the form of a cylinder sleeved on the inner end 258 of each pedal unit 52, 62 by a nut and bolt assembly 260. The outer member 54 projects inwardly beyond the inner end 258 of its pedal unit to provide a socket 262 having an annular inner wall which is cylindrical except for interruptions or recesses 264 therein. The inner member 256 of each clutch is formed by the integral end portion of the driven shaft 42. As seen in FIG. 4, such inner end portions substantially abut the inner ends 258 of the pedal units.

The recesses 264 of which there are in this instance four spaced apart equal angular distances, each has a radial driving shoulder 266 which preferably is in a plane parallel to the longitudinal center line of the outer member 254. Each recess also has a tapered surface 268 which extends from the outer extremity of the driving shoulder on a slight curve back to the basic cylindrical or circular configuration of the socket 262.

The inner member 256 of each clutch is as before stated formed as an integral part of the driven shaft 42, and has a transverse slot 270 cutting diametrically across the shaft from one side to the other, also preferably opening through the outer end of the inner member. In this slot there is a radially slidable dog or lug 272 which is urged radially outwardly by the compression leaf spring 274 also housed in the slot. One side of the slot is partially closed or overlapped by the tangs or extensions 276 to confine the spring. The spring may be welded to the extensions and has a retaining end 277 for holding the lug in the slot.

In the forward direction of pedaling, the outer member 254 of each clutch turns in the direction of the arrow 278. The lug 272 urged radially outwardly by its spring moves into a recess and is engaged by a driving shoulder 266 to rotate the inner member of the clutch and accordingly rotate the forward sprocket 40 to move the vehicle in a forward direction through the transmission 72. Should the rider reverse pedal his pedal unit, the lug 272 is cammed radially inwardly by the tapered surfaces 268 of the recesses 264 without imparting any driving force to the transmission.

In accordance with this construction, one rider may pedal the vehicle in a forward direction while the other rider holds his feet stationary on his pedals. The clutch associated with his pedals will merely ratchet without forcing his pedals to go around. Both riders may of course pedal together if they wish.

What I claim as my invention is:

1. A transmission for selectively engaging any one of a plurality of transmission members, comprising a power input shaft rotatably mounting said transmission members, a ratchet assembly associated with each transmission member, each ratchet assembly including a ratchet gear connected to the associated transmission member, each ratchet assembly also including a ratchet pawl unit having a housing fixed upon said shaft, a pawl mounted on each housing for movement into and out of engagement with the teeth of the associated ratchet gear, and shifting means for selectively moving any one of said pawls into engagement with the teeth of its associated ratchet gear while at the same time moving the other pawls away from engagement with the teeth of their associated ratchet gears.

2. The transmission defined in claim 1, wherein said shifting means comprises a rod mounted for axial shifting movement and having a cam surface, and followers extending between said respective pawls and said cam surface operative to move said pawls as aforesaid in response to axial shifting movement of said rod.

3. The transmission defined in claim 2, wherein means are provided for holding said followers in contact with said cam surface.

4. The transmission defined in claim 3, wherein said cam surface includes axially spaced alternate lands and recesses, said followers when engaging a cam recess allowing said pawls to be held in engagement with the teeth of the associated ratchet gears by said holding means and when engaging a land moving said pawls away from engagement with the teeth of the associated ratchet gears.

5. The transmission defined in claim 1, wherein said pawls are pivotally connected near one end thereof to the associated housing and have detents near their opposite ends engageable with the teeth of said ratchet gears, the construction and arrangement of said pawls and the tooth contour of said ratchet gears being such that said pawls upon rotation in one direction will drive said ratchet gears when the detents thereof are engaged with the teeth of said ratchet gears but the teeth of said ratchet gears will cam past said detents when said ratchet gears turn faster in said one direction than said pawls.

6. The transmission defined in claim 5, wherein said shifting means comprises a rod mounted for axial shifting movement and having a cam surface, followers extending between said respective pawls and said cam surface operative to move said pawls as aforesaid in response to axial shifting movement of said rod, and spring means holding said followers in contact with said cam surface.

7. The transmission defined in claim 6, wherein said cam surface includes axially spaced alternate lands and recesses, said followers when engaging a cam recess allowing said pawls to be held in engagement with the teeth of the associated ratchet gears by said spring means and when engaging a land moving said pawls away from engagement with the teeth of the associated ratchet gears.

8. The transmission defined in claim 7, wherein said alternate lands and recesses are connected by tapered surfaces and are spaced so that when shifting from one gear to the next the corresponding followers will cause simultaneous engagement of the associated pawls with their respective ratchet gears.

9. The transmission defined in claim 8, wherein said followers are pins guided for axial sliding movement by said housings and having their opposite ends engageable respectively with said pawls and cam surfaces.

* * * * *